US012666284B2

(12) United States Patent
Mengwasser

(10) Patent No.: US 12,666,284 B2
(45) Date of Patent: Jun. 23, 2026

(54) TESTING A COMMUNICATIONS NETWORK BY VARYING RADIO PARAMETERS

(71) Applicant: DISH Wireless L.L.C., Englewood, CO (US)

(72) Inventor: Brian Mengwasser, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 546 days.

(21) Appl. No.: 17/966,600

(22) Filed: Oct. 14, 2022

(65) Prior Publication Data

US 2023/0308911 A1 Sep. 28, 2023

Related U.S. Application Data

(60) Provisional application No. 63/323,973, filed on Mar. 25, 2022.

(51) Int. Cl.
*H04W 24/08* (2009.01)
*H04W 28/18* (2009.01)
(52) U.S. Cl.
CPC ........... *H04W 24/08* (2013.01); *H04W 28/18* (2013.01)

(58) Field of Classification Search
None
See application file for complete search history.

(56) References Cited

U.S. PATENT DOCUMENTS

| | | | | |
|---|---|---|---|---|
| 2008/0227405 A1* | 9/2008 | Harel | .................... | H04W 52/42 |
| | | | | 455/135 |
| 2018/0132111 A1* | 5/2018 | Mueck | ................. | H04B 1/7136 |
| 2020/0169962 A1* | 5/2020 | Fakoorian | ............. | H04L 1/1858 |
| 2020/0322826 A1* | 10/2020 | Wangler | ................. | H04L 43/50 |
| 2021/0168731 A1* | 6/2021 | Jung | ..................... | H04W 52/24 |
| 2023/0043262 A1* | 2/2023 | Jung | ..................... | H04W 16/18 |

* cited by examiner

*Primary Examiner* — Saad Khawar
(74) *Attorney, Agent, or Firm* — Seed Intellectual Property Law Group LLP

(57) ABSTRACT

A method and apparatus for optimizing coverage of a network are provided. In the method and apparatus, parameters of the network are varied during a first period of time when the network is actively used for trafficking data in a geographic area. In response to varying the parameters, signal quality for the network and an optima for the signal quality are determined. A first set of parameters that result in the optima for the signal quality are identified and the network is configured to use the first set of parameters during a second period of time subsequent to the first period of time.

18 Claims, 5 Drawing Sheets

200

202
Vary one or more parameters of a network

204
Determine signal quality in the communication environment

206
End analysis of communication environment?

NO

YES

208
Output a report and/or adjust network parameters for subsequent operation based on an optima of the signal quality

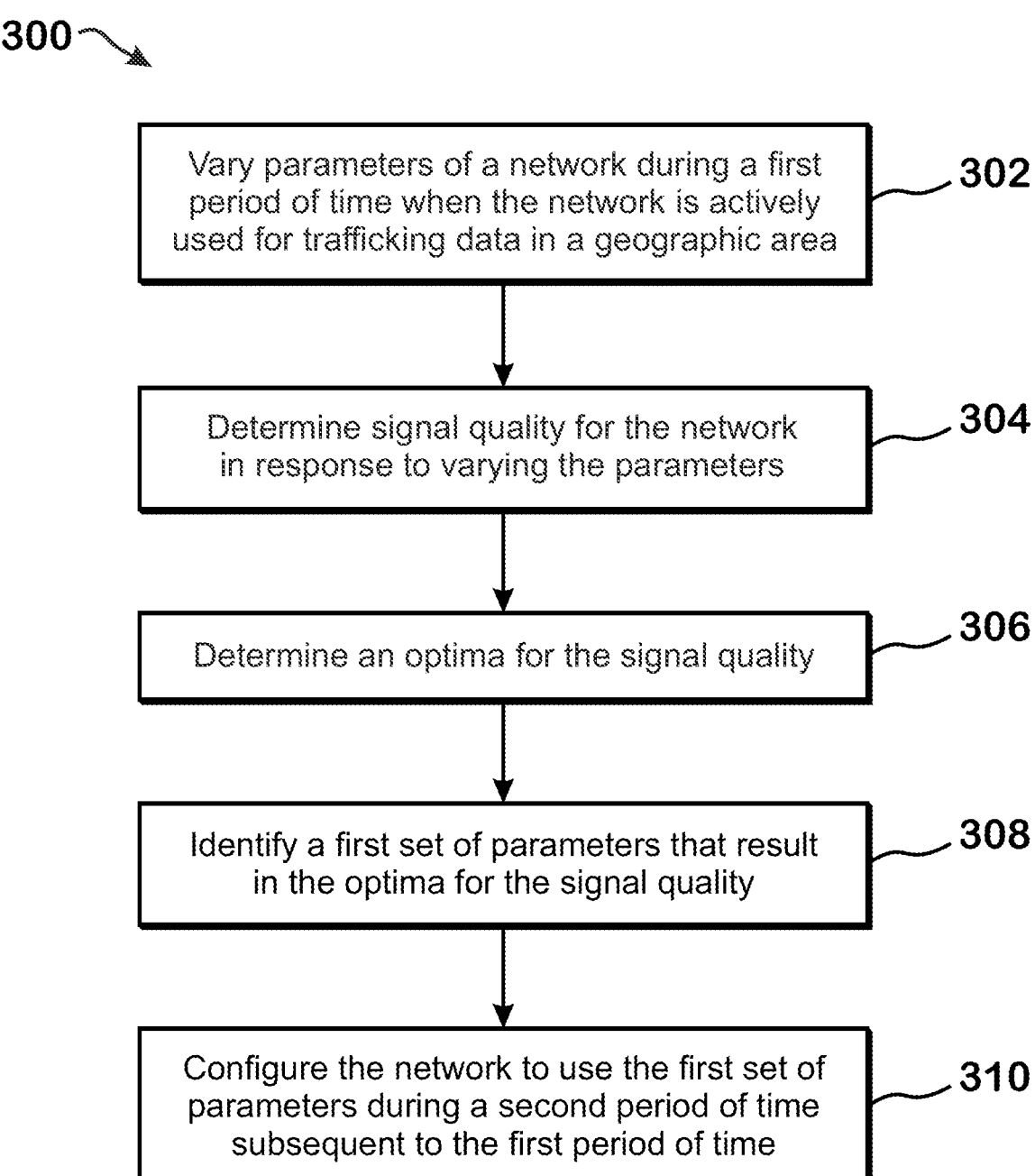

300

Vary parameters of a network during a first
period of time when the network is actively
used for trafficking data in a geographic area — 302

Determine signal quality for the network
in response to varying the parameters — 304

Determine an optima for the signal quality — 306

Identify a first set of parameters that result
in the optima for the signal quality — 308

Configure the network to use the first set of
parameters during a second period of time
subsequent to the first period of time — 310

FIG. 3

TESTING A COMMUNICATIONS NETWORK BY VARYING RADIO PARAMETERS

BACKGROUND

Technical Field

This application is directed to testing and optimizing a communications network and, in particular, testing and optimizing a communications network by varying radio parameters of the communications network.

Description of the Related Art

Network coverage and network quality are typically measured by signal quality, which indicates permissible data throughput, signal level and interference level, among others. The quality and coverage of the network vary depending on multiple factors including interference generated by devices using the network and devices operating outside the network, movement in a geographic area of the network, terrain, and artificial monuments, such as buildings, weather and foliage, among others. Communication networks are deployed in dynamic environments that change over time. Oftentimes an environment in which a communication network provides coverage is continuously changing.

BRIEF SUMMARY

In an embodiment, a system includes a noise configuration server configured to vary parameters of a network during a first period of time when the network is actively used for trafficking data in a geographic area. The system includes a measurement analysis server configured to determine signal quality for the network in response to varying the parameters, determine an optima for the signal quality and identify a first set of parameters that result in the optima for the signal quality. The system includes a network configuration server configured to configure the network to use the first set of parameters during a second period of time subsequent to the first period of time.

In an embodiment, the network includes a plurality of radiating antennas and a plurality of user equipment. In an embodiment, the noise configuration server is configured to vary the parameters of the network by at least: varying a frequency band used by a radiating antenna of the plurality of radiating antennas, varying a modulation scheme used by the radiating antenna of the plurality of radiating antennas, varying a transmit power of the radiating antenna of the plurality of radiating antennas, varying a beam direction of an antenna array or varying an antenna polarization of the radiating antenna.

In an embodiment, the noise configuration server is configured to vary the parameters of the network by at least: varying a frequency band used by a user equipment of the plurality of user equipment, varying a modulation scheme used by the user equipment of the plurality of user equipment or varying a transmit power of the user equipment of the plurality of user equipment.

In an embodiment, the measurement analysis server configured to receive first signal quality measurements from a cell, the radiating antenna or a base station and receive second signal quality measurements from the plurality of user equipment. In an embodiment, the measurement analysis server is configured to determine the signal quality based on the first signal quality measurements and the second signal quality measurements. In an embodiment, the measurement analysis server is configured to determine a plurality of signal qualities of a plurality of locations, respectively, in the geographic area. In an embodiment, the measurement analysis server is configured to determine the optima for the signal quality at a location of the plurality of locations. In an embodiment, the measurement analysis server is configured to aggregate the plurality of signal qualities and determine the optima for the aggregated plurality of signal qualities.

In an embodiment, the signal quality is at least one of a signal-to-noise-and-interference ratio (SINR), power spectral density, channel impulse response, channel state information (CSI), modulation error vector magnitude (EVM), reference signal received power (RSRP), received signal strength indicator (RSSI), reference signal received quality (RSRQ) or a key performance indicator (KPI). In an embodiment, the noise configuration server is configured to vary the parameters of the network by at least: determining whether one or more preceding changes to the parameters of the network caused the signal quality to increase or decrease, in response to determining that the one or more preceding changes to the parameters caused the signal quality to decrease, reversing the one or more preceding changes to the parameters and in response to determining that the one or more preceding changes to the parameters caused the signal quality to increase, varying the parameters of the network to make a magnitude of change to the parameters greater than the magnitude of change accomplished by the one or more preceding changes.

In an embodiment, a method for optimizing coverage of a network includes varying parameters of the network during a first period of time when the network is actively used for trafficking data in a geographic area, in response to varying the parameters, determining signal quality for the network, determining an optima for the signal quality, identifying a first set of parameters that result in the optima for the signal quality and configuring the network to use the first set of parameters during a second period of time subsequent to the first period of time.

In an embodiment, the network includes a plurality of radiating antennas and a plurality of user equipment, and varying the parameters of the network includes varying a frequency band used by a radiating antenna of the plurality of radiating antennas, varying a modulation scheme used by the radiating antenna of the plurality of radiating antennas, varying a transmit power of the radiating antenna of the plurality of radiating antennas, varying a beam direction of the radiating antenna of the plurality of radiating antennas, or varying an antenna polarization of the radiating antenna of the plurality of radiating antennas.

In an embodiment, varying the parameters of the network includes: varying a frequency band used by a user equipment of the plurality of user equipment, varying a modulation scheme used by the user equipment of the plurality of user equipment or varying a transmit power of the user equipment of the plurality of user equipment. In an embodiment, the method includes receiving first signal quality measurements from a cell, the radiating antenna or a base station and receiving second signal quality measurements from the plurality of user equipment.

In an embodiment, the method includes determining the signal quality based on the first signal quality measurements and the second signal quality measurements. In an embodiment, determining the signal quality includes determining a plurality of signal qualities of a plurality of locations, respectively, in the geographic area.

In an embodiment, the method includes determining the optima for the signal quality at a location of the plurality of locations. In an embodiment, the method includes aggregating the plurality of signal qualities and determining the optima for the aggregated plurality of signal qualities. In an embodiment, the signal quality is at least one of a signal-to-noise-and-interference ratio (SINR), power spectral density, channel impulse response, channel state information (CSI), modulation error vector magnitude (EVM), reference signal received power (RSRP), received signal strength indicator (RSSI), reference signal received quality (RSRQ) or a key performance indicator (KPI).

In an embodiment, varying the parameters of the network includes: determining whether one or more preceding changes to the parameters of the network caused the signal quality to increase or decrease, in response to determining that the one or more preceding changes to the parameters caused the signal quality to decrease, reversing the one or more preceding changes to the parameters and in response to determining that the one or more preceding changes to the parameters caused the signal quality to increase, varying the parameters of the network to make a magnitude of change to the parameters greater than the magnitude of change accomplished by the one or more preceding changes.

BRIEF DESCRIPTION OF THE SEVERAL VIEWS OF THE DRAWINGS

FIG. 3 shows a flow diagram of a method for optimizing coverage of a network.

DETAILED DESCRIPTION

Figure 1:
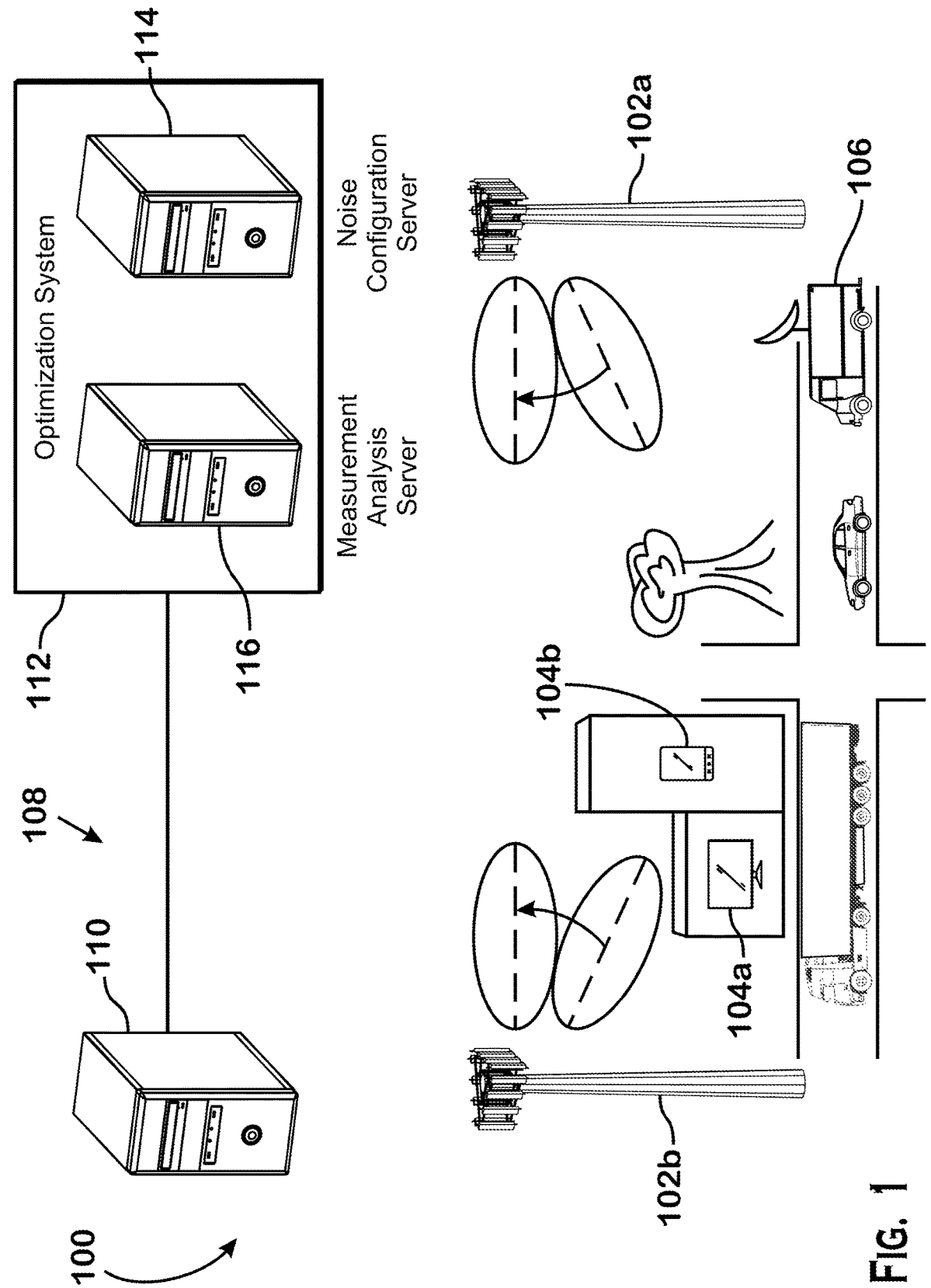
FIG. 1 shows an example of a wireless communication environment in accordance with an embodiment.

FIG. 1 shows an example of a wireless communication environment 100 in accordance with an embodiment. The environment 100 includes a plurality of base stations 102*a*, 102*b* (collectively referred to by the numeral alone), a plurality of user equipment 104*a*, 104*b* (collectively referred to by the numeral alone), testing and measurement equipment 106 and network infrastructure 108. The network infrastructure 108 includes a network configuration server 110 and an optimization system 112. The optimization system 112 includes a noise configuration server 114 and a measurement analysis server 116. Wireless communication in the environment 100 may be performed using any communications protocol. The protocol may be a cellular communications protocol, such as the 3rd Generation Partnership Project (3GPP) Global System for Mobile Communications (GSM), Universal Mobile Telecommunications System (UMTS), Long-Term Evolution (LTE), Fifth Generation New Radio (5G NR) or Internet Protocol Multimedia Subsystem (IMS), or a computer networking protocol, such as the Institute of Electrical and Electronics Engineers (IEEE) standards for local area networks (LAN), personal area network (PAN) or metropolitan area networks (MAN), among others. Although a wireless network that traffics data over the air is described herein, the techniques described herein may be used for non-wireless or wired networks that traffic data over different media.

Network coverage and the quality thereof in the communication environment 100 varies depending on location and multiple factors, such as weather, foliage, interference generated by the plurality of base stations 102 and the plurality of user equipment 104, car and people movement, terrain and artificial monuments including buildings, among others. Noise and interference may be generated by sources internal to the communication network, such as smartphones that are part of the network, and sources external to the communication network, such as jammers or other electronic devices causing radio frequency leakage into the network. Interference may be intra-system interference from adjacent cells or antennas causing interference due to operation in the same or adjacent frequency band. It is noted that, as described herein, network refers to the communication devices of the environment 100. The environment, which includes a network, refers herein to the physical space in which the network is disposed. For example, the environment may be one or more geographic locations.

The performance of the network in terms of network coverage and quality in the environment 100 may be quantified using a signal quality metric. The signal quality may include a signal-to-noise-and-interference ratio (SINR), power spectral density, channel impulse response, channel state information (CSI), modulation error vector magnitude (EVM), reference signal strength including a reference signal received power (RSRP), received signal strength indicator (RSSI) or reference signal received quality (RSRQ) or a specialized or custom metric, among others. The specialized or custom metric may be a rating, score or key performance indicator (KPI). For example, the specialized or custom metric may be a mean, weighted-average or any other function of a plurality of signal quality measurements.

A base station 102 may be any type of device configured to transmit downlink data to another device, such as the user equipment 104, receive uplink data from another device, and generally provide network connectivity to devices positioned in the environment 100. The base station 102 may include a transceiver (not shown) for communicating with the user equipment 104. The transceiver may include a steerable array of antennas that is one-dimensional, two-dimensional or three-dimensional and that is operative to electronically steer a beam in a particular direction. The base station 102 is coupled to the network configuration server 110. The base station 102 receives from the network configuration server 110 radio parameters that dictate the operation of the base station 102 and individual antennas or antenna array(s) thereof. For example, the base station 102 may receive an indication of a frequency band, modulation, scheduling, transmit power, beam direction or antenna polarization to use when communicating with the user equipment. Although the term base station is used herein, the environment 100 is not limited to cellular communications. For example, the base station 102 may be a wireless access point in a computer networking environment.

The user equipment 104 may be any type of device that is configured to communicate wirelessly. The user equipment 104 may be a smart phone, laptop, tablet and access point or router that is configured to act as a gateway to other user equipment, among others. The user equipment 104 may transmit uplink data to the base station 102 and received downlink data from the base station. The user equipment 104 also communicates with the network communication server 110. The user equipment 104 receives, from the network communication server 110, parameters that control the operation of the user equipment 104. For example, the user equipment 104 may receive an indication of a frequency band, modulation, scheduling or transmit power, among others, to use when communicating with the base station 102.

In response to setting the network parameters, the base station 102 and user equipment 104 may perform signal quality measurement and report the measured signal quality. The base station 102 and user equipment 104 may measure an SINR, CSI, RSRP, RSSI, or RSRQ, among others. The base station 102 and user equipment 104 may report the signal quality to the measurement analysis server 116. The signal quality measurements may be made on downlink or uplink data as part the communication protocol employed by the base station 102 or user equipment 104, whereby, for example, the base station 102 or user equipment 104 may perform and report the measurements while communicating over the network. The signal quality measurements may be repurposed for evaluating the effect of changing the parameters on the network. Additionally or alternatively, the base station 102 or user equipment 104 may be commanded (through control signaling) to perform measurements for the purpose of evaluating the effect of changing the parameters on the signal quality. The downlink or uplink data may be communication data intended to be communicated between the user equipment 104 and the base station 102. For example, the downlink or uplink data may be include communication data and control data associated with the communication data. Alternatively, the downlink or uplink data may be synthetic data used to emulate various loading conditions. The optimization described herein may be performed using the synthetic data and prior to trafficking live user data. Accordingly, an optimized network is used to traffic live user data.

The environment 100 may include the testing and measurement equipment 106 (also referred to as drive and walk testing equipment). The testing and measurement equipment 106 may be passive equipment that performs reception or active equipment that performs transmission and reception. The testing and measurement equipment 106 may be drive testing equipment.

The testing and measurement equipment 106 may be mobile equipment configured to measure the signal quality in the environment 100. The testing and measurement equipment 106 may be positioned at different locations in the environment 100. The testing and measurement equipment 106 may be a mobile vehicle that is outfitted with testing and measurement equipment. The testing and measurement equipment 106 may report the signal quality to the measurement analysis server 116. It is noted that active communication devices (such as the base station 102 and user equipment 104) that are already positioned in the environment 100 and/or a dedicated measurement device (such as the testing and measurement equipment 106) may be used for measuring and reporting signal quality. The testing and measurement equipment 106 may include a radio frequency (RF) scanner, among other frequency and/or network analyzers.

The network configuration server 110 may be any computer system, such as a server, configured to vary the parameters of communication devices in the environment 100. The parameters may include a frequency band, modulation, data or control scheduling, transmission or reception timing, transmit power, beam direction or antenna polarization of antennas, the base stations 102 and/or the user equipment 104. The parameters of base stations 102 and antenna arrays or antennas thereof may be varied differently. It is noted that varying the parameters of communication devices may include varying the number and location of base stations. In some embodiments, there is a tight coupling between a base station and radiating antennas, and varying the parameters of the base station includes varying the parameters of the radiating antennas. However, alternatively a base station may have multiple antennas having parameters that are varied independently of each other (for example, distributed antenna systems (DAS) and centralized radio access network (C-RAN)). Further, varying parameters may include varying the parameters of a signal, such as a Primary Synchronization Signal (P-SS) or a Secondary Synchronization Signal (S-SS), or resources, such as physical resource blocks (PRBs) in multiple-input and multiple-output (MIMO) communications.

The network configuration server 110 is in communication with the base stations 102 and the user equipment 104. The network configuration server 110 sends control data to the base stations 102 (or antennas) and the user equipment 104 including the parameters. The network configuration server 110 may vary the parameters of communication devices in the environment 100 online and while a communications network is actively used. Varying the parameters of communication devices may be tantamount to injecting noise in the network due to the fact that a parameter that is varied reduces the signal quality in the network. For example, if an antenna beam direction is changed to point away from a device that transmits data, the signal quality deteriorates. However, a network and an environment thereof is a complex environment, and there are numerous factors that affect the signal quality in the network. Varying the network parameters is used herein to explore parameter settings (operating points of the network) that result in improving signal quality. Further, knowing the manner in which parameter setting affects the network improves the understanding of the network and the coverage and characteristics thereof.

The noise configuration server 114 may be any computer system, such as a server, configured to set the parameters of communication devices in the environment 100. The noise configuration server 114 may determine the manner in which the parameters are varied as described herein. The noise configuration server 114 is in communication with the network configuration server 110. The noise configuration server 114 sends, to the network configuration server 110, the set parameters to the noise configuration server 114, which in turns transmits the parameters to the communication devices. The noise configuration server 114 is coupled to the measurement analysis server 116 and receives measurements analysis results from the measurement analysis server 116. The noise configuration server 114 sets the parameters in accordance with the received measurements analysis results.

The measurement analysis server 116 may be any computer system, such as a server, configured to receive the measurements of signal quality from the base stations 102 (or antennas) and the user equipment 104. The measurement analysis server 116 may, for example, determine whether an optima (local or global) for the signal quality has been reached. The measurement analysis server 116 may send the measurement analysis results to the measurement analysis server 116 for evaluating whether to change the parameters of the communication devices in the environment 100.

The measurement analysis server 116 may be a centralized server for receiving data or a distributed server. For example, multiple servers may be distributed in a field and/or different sources of data may feed a centralized server in another place physically or logically. Data sources may be user equipment or independent/specialized active or passive measurement equipment. Further, data may be received from adjacent cells. In addition, multiple measurement analysis servers may be grouped within a larger network.

Figure 2:
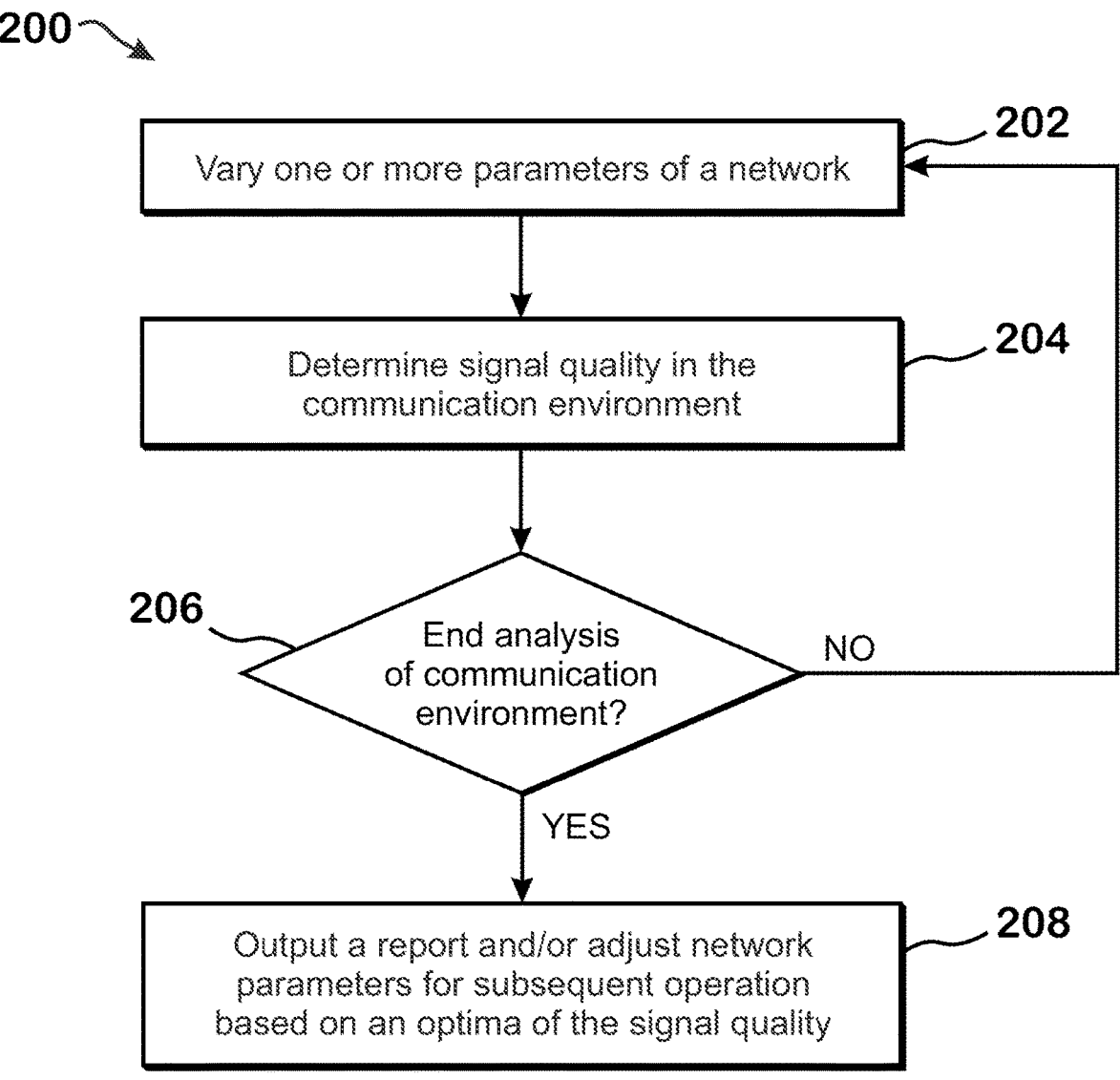
FIG. 2 shows a flow diagram of a method for varying network parameters.

FIG. 2 shows a flow diagram of a method 200 for varying network parameters. The method 200 includes, at 202, varying one or more parameters of a network. A network entity, such as the noise configuration server 114, may vary the one or more parameters deterministically. A first parameter may be changed incrementally to test the responsiveness of the signal quality to a wide range of inputs. When the range of the first parameter has been tested, the noise configuration server 114 may subsequently change a second parameter for all or a subset of values of the first parameter. Similarly, subsequent parameters may be varied for all or a subset of values of preceding parameters. For example, the noise configuration server 114 may change the transmit power of the first base station 102a in steps of one decibel (dB). For each 1 dB step or for a subset of the 1 dB steps, the noise configuration server 114 may vary a tilt of an antenna array of the second base station 102b by one degree. For all or a subset of the 1 dB transmit power steps of the first base station 102a and for all or a subset of one degree tilt changes of the second base station 102b, the noise configuration server 114 may change the frequency band used for communication in the environment 100.

Alternatively, the noise configuration server 114 may change multiple parameters simultaneously to reduce the number of possible combinations of parameters. The noise configuration server 114 may also vary the parameters randomly or pseudo-randomly without use of a scheduled or a deterministic approach. At each iteration, the noise configuration server 114 randomly or pseudo-randomly varies multiple parameters to test the signal quality for the randomly or pseudo-randomly-selected set of parameters. In the random/pseudo-random approach, the noise configuration server 114 may not test all possible combinations of parameters. However, the random/pseudo-random approach yields a representative sample of parameter variations.

Furthermore, the noise configuration server 114 may utilize a feedback/closed loop approach to varying the parameters. The noise configuration server 114 may use a determined signal quality associated with a previously performed parameter variation to determine a subsequent parameter variation and ensure convergence on an optima. For example, if the noise configuration server 114 reduces the transmit power of a base station 102 (or antenna), and the reduction result in reducing signal quality, the noise configuration server 114 may abandon further power reduction and instead increase the transmit power to test the signal quality response. Further, if the noise configuration server 114 causes a beam direction of an antenna array to tilt to a first direction, and the tilt results in reducing signal quality, the noise configuration server 114 may abandon tilting the antenna array in the first direction and instead tilt the array in a different direction to test the signal quality response. The noise configuration server 114 may evaluate the signal quality of performed changes to guide subsequent changes to a signal quality optima.

In some cases it may be advantageous to identify sets of parameters which are intentionally not optima to validate this knowledge and more rapidly converge on the optima. One could imagine proceeding randomly for the first several iterations, for example, until sufficient information to estimate optima was obtained The noise configuration server 114 may determine whether one or more preceding changes to the parameters caused the signal quality to increase or decrease. If the signal quality decreased, the noise configuration server 114 reverses the one or more preceding changes to the parameters. For example, instead of decreasing transmit power as performed in the one or more preceding changes, the noise configuration server 114 may increase transmit power. If the signal quality increases, the noise configuration server 114 subsequently varies the parameters to make a magnitude of change to the parameters greater than the magnitude of change accomplished by the one or more preceding changes. For example, if in the preceding changes, the beam direction was changed by 5 degrees in a first direction, the noise configuration server 114 may in subsequent changes adjust the beam direction to be 7.5 degrees in the first direction.

The signal quality typically has multiple local optima and one global optima. Upon reaching an optima, the noise configuration server 114 may continue to vary network parameters to determine whether the optima is a global or local optima.

The noise configuration server 114 may also vary the parameters of the communication environment 100 based on a change in the communication environment. The change in the parameters may be commensurate with the change in the communication environment. The change in the communication environment may be determined based on a change observed in a signal quality of the environment. For example, if the signal quality changes by a relatively small magnitude (e.g., in steady state and un-triggered by parameter variation), then it can be surmised that the environment is not changing significantly. In testing the environment, the parameters may correspondingly be changed in relatively small increments of magnitude. Conversely, when monitoring the signal quality of the environment, if the signal quality is observed to experience relatively large changes, relatively large changes in the parameters may be made to test the environment. The parameters are varied proportionally significantly to the change observed in the environment to maintain a level of information about the performance of the network. Doing so facilitates better tracking of the optima as the optima changes with the change in the environment.

At 204, a network entity, such as the measurement analysis server 116, determines the signal quality in the communication environment. The measurement analysis server 116 may receive local signal quality measurements from devices actively communicating in the environment, such as the base station 102 and user equipment 104. In addition, dedicated testing equipment (e.g., the testing and measurement equipment 106) may be deployed in the environment and may send signal quality measurements made at a location of the dedicated testing equipment. The various devices may measure the same or different signal quality metrics. If the same metric is used, the measurement analysis server 116 may aggregate the received measurements to produce a signal quality for the environment using the same metric. Alternatively, the measurement analysis server 116 may aggregate the signal quality measurements made using different metrics into a new metric that is an aggregate metric for the environment.

Each signal quality measurement may be associated with a location at which the measurement is made. The measurement analysis server 116 may determine the signal quality for both locations at which measurements were made as well as locations at which measurements were not made. The measurement analysis server 116 may utilize sub-sampling. The measurement analysis server 116 may extrapolate measurements made at two or more different locations in the environment to determine signal quality made at other locations (for example, between the two or more different locations).

The measurement analysis server 116 may determine signal quality for different positions in the network. For example, each one square meter (m²) or 10 m², among others, may be associated with a signal quality. Further, the measurement analysis server 116 may determine an aggregate signal quality for the geographic area of the environment that is within coverage of the network.

At 206, a network entity, such as the measurement analysis server 116 or the noise configuration server 114, determines whether to end noise analysis of the communication environment. If a negative determination is made, the method 200 reverts to varying one or more parameters of the network at 202. As described herein, the one or more parameters may be varied depending on the determined signal quality associated with previously varied parameters.

If a positive determination is made, a network entity, such as the measurement analysis server 116, at 208 outputs a report of signal quality and/or adjusts network parameters for subsequent operation based on an optima of the signal quality. Following determining the signal quality associated with a variety of parameter values, an optima for signal quality may be determined. The optima corresponds to set parameters. The network configuration server 110 adjusts the parameters of the network to the parameters corresponding to the optima to operate the network in an optimal fashion.

Additionally or alternatively, the measurement analysis server 116 may generate a report including parameters that result in reaching a global optima or one or more local optima and/or an associated coverage map that shows the signal quality at various locations in the environment.

In an embodiment, the network may be an Open Radio Access Network (Open RAN). A radio intelligent controller (RIC) of the Open RAN may perform the network configuration described herein with reference to the network configuration server 110. Further, the radio intelligent controller may have a software platform (RIC interface platform) in which xApps or rApps may be provided for network management and optimization. The RIC interface platform may be used to perform the noise configuration and measurement analysis described herein with reference to the noise configuration server 114 and a measurement analysis server 116. However, as described herein, the network may be a cellular network or a local area Wi-Fi network, among others. The network configuration server 110 and the optimization system 112 may be implemented in software (xApp or rApp) and may be executed virtually using a distributed computing system, such as a cloud-based computing system.

FIG. 3 shows a flow diagram of a method 300 for optimizing coverage of a network. In the method 300, a network entity, such as the noise configuration server 114 described herein, varies, at 302, parameters of a network during a first period of time when the network is actively used for trafficking data in a geographic area. A network entity, such as the measurement analysis server 116 described herein, determines signal quality for the network in response to varying the parameters at 304. The measurement analysis server 116 at 306 determines an optima for the signal quality. The measurement analysis server 116 at 308 identifies a first set of parameters that result in the optima for the signal quality. In the method 300, a network entity, such as the network configuration server 110, configures, at 310, the network to use the first set of parameters during a second period of time subsequent to the first period of time.

Figure 4:
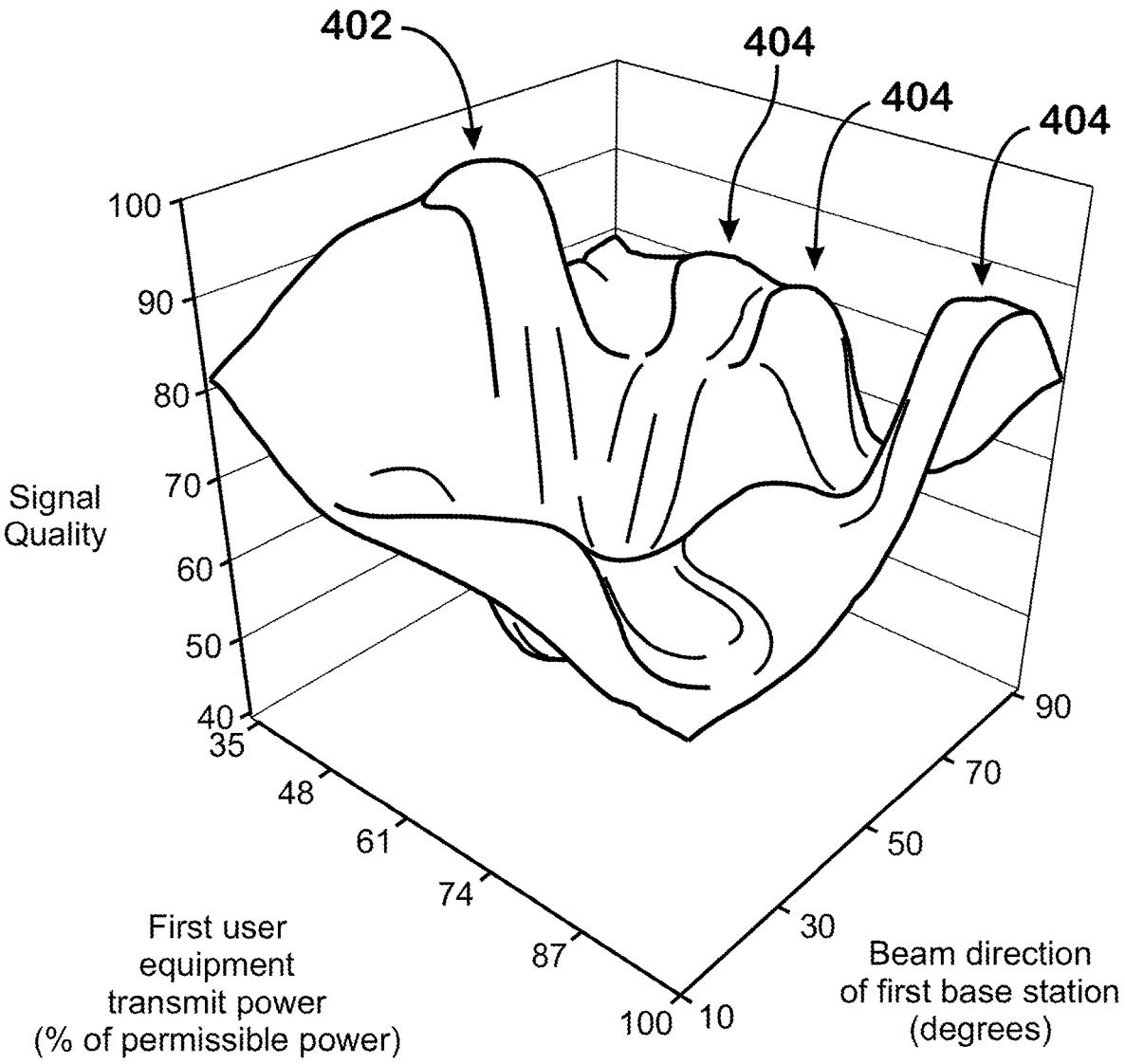
FIG. 4 shows an example of determining signal quality.

FIG. 4 shows an example of determining signal quality. In the example, the noise configuration server 114 varies the beam direction of the first base station 102*a* between 10 and 19 degrees and varies the transmit power of the first user equipment 104*a* from 35% to 100% of a maximum power permissible by a communication protocol. The measurement analysis server 116 determines the signal quality for each variation (for example, incremental variation) of the parameters. Although two parameters are shown in FIG. 4 to facilitate description, it is noted that the number of parameters may be more than two. Accordingly, the signal quality may depend on a larger number of variables.

The signal quality has a global optima 402 and multiple local optima 404. When one or more of the optima 402, 404 are determined, the network may be operated in accordance with the parameters corresponding to the optima. Alternatively, the network may be operated using parameters that avoid the valley observed in the signal quality. The measurement analysis server 116 may store an association between parameters and the signal quality corresponding to the parameters for determining the optima and the parameters corresponding to the optima. It is noted that various points on the signal quality surface may be approximated (using extrapolation). In addition, the signal quality may be for one geographic location in the environment 100 or an aggregate for multiple geographic locations.

Figure 5:
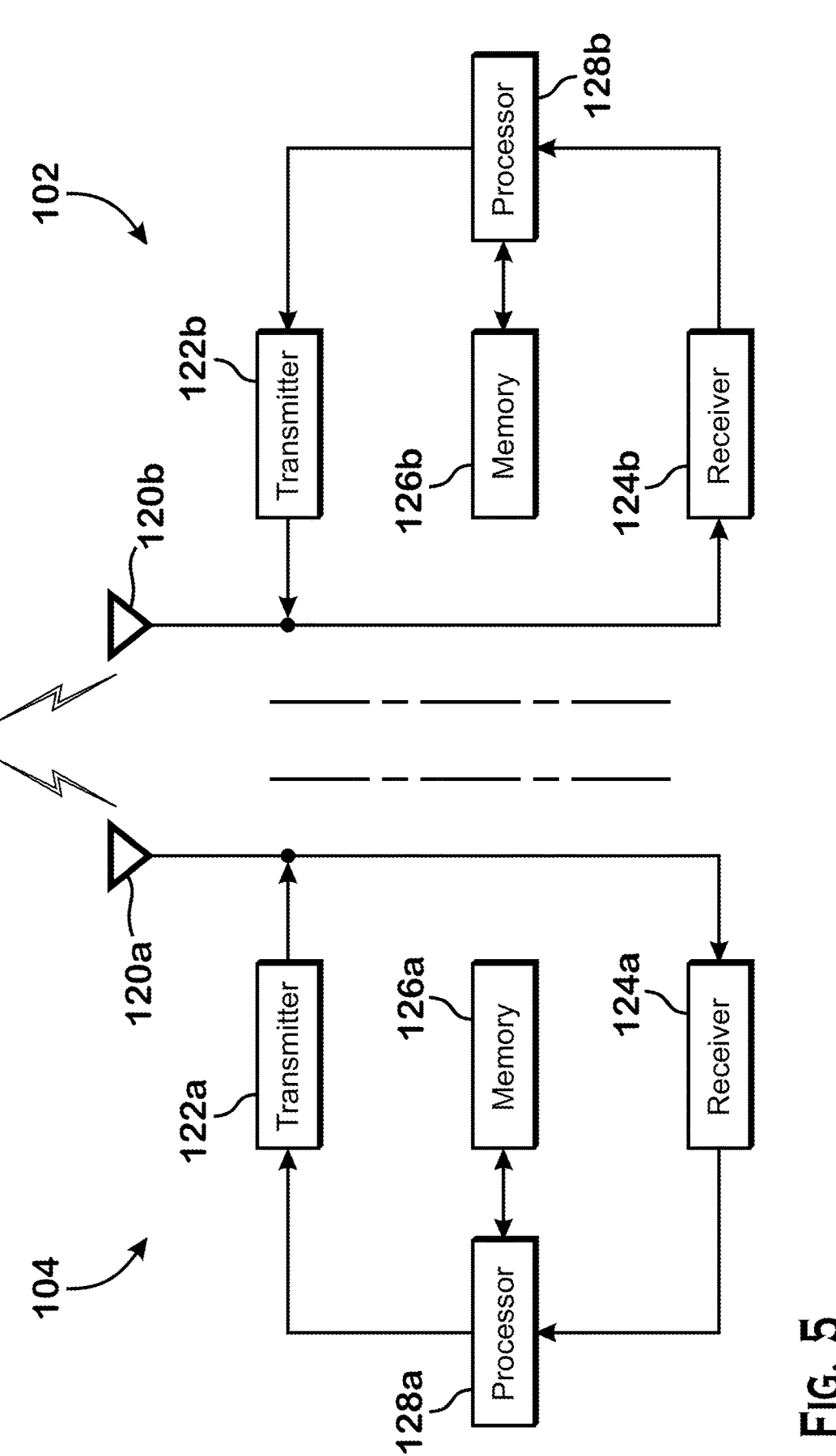
FIG. 5 shows a block diagram of a base station and a user equipment.

FIG. 5 shows a block diagram of a base station 102 and a user equipment 104. The user equipment 104 transmits in the uplink and receives in the downlink. The base station 102 receives in the uplink and transmits in the downlink. The user equipment 104 and the base station 102 respectively include one or more antennas 120*a*, 120*b* for receiving signals, which may be electromagnetic signals.

The user equipment 104 and the base station 102 respectively include a transmitter 122*a*, 122*b*. The transmitter 122*a*, 122*b* may be any type of device configured to transmit a signal by controlling the one or more antennas 120*a*, 120*b*, respectively. The user equipment 104 and the base station 102 respectively include a receiver 124*a*, 124*b*, which may be any type of device configured to transmit a signal by controlling the one or more antennas 120*a*, 120*b*, respectively.

The user equipment 104 and the base station 102 or another network entity respectively include memory 126*a*, 126*b*. The memory 126*a*, 126*b* may be any type of non-transitory computer-readable storage medium. The memory 126*a*, 126*b* may be read-only memory (ROM) or random access memory (RAM), among others. Further, the memory 126*a*, 126*b* may be static or dynamic. The memory 126*a*, 126*b* stores the computer-executable instructions that may be retrieved or accessed by a respective processor 128*a*, 128*b* for execution. The computer-executable instructions, when executed by the respective processor 128*a*, 128*b*, cause the respective processor 128*a*, 128*b* (or user equipment 104 or base station 102) to operate as described herein.

The user equipment 104 and the base station 102 include the processor 128*a*, 128*b*, respectively. The processor 128*a*, 128*b* is configured to perform the techniques and methods described herein. The transmitter 122*a*, 122*b*, the memory 126*a*, 126*b*, the receiver 124*a*, 124*b*, the processor 128*a*, 128*b* and the one or more antennas 120*a*, 120*b* within the user equipment 104 or the base station 102 may be configured to mutually interact and communicate with one another. The transmitter 122*a*, receiver 124*a*, memory 126*a* and processor 128*a* of the user equipment 104 may respectively be implemented by a separate chip as independent elements, or may be implemented by two or more chips. The transmitter 122*a*, 122*b* and the receiver 124*a*, 124*b* may be incorporated into one device, whereby one transceiver may be implemented within the user equipment 104 or the base station 102 or another network entity. The one or more antennas 120*a*, 120*b* may be configured to wirelessly transmit a signal generated by the transmitter 122*a*, 122*b* to an external environment, or receive a radio signal from the external environment and transfer the received radio signal to the receiver 124*a*, 124*b*. Transmission and reception devices that support multi-input multi-output (MIMO) communication for data transmission and reception based on multiple antennas may be used.

The processor 128*a*, 128*b* generally controls the overall operation of the user equipment 104 or the base station 102. In particular, the processor 128*a*, 128*b* may perform various control functions for performing the techniques described herein. The processor 128*a*, 128*b* may be a controller, a microcontroller, a microprocessor, or a microcomputer. The processor 128*a*, 128*b* may be implemented by hardware, firmware, software, or their combination. Application-specific integrated circuits (ASICs), digital signal processors (DSPs), digital signal processing devices (DSPDs), pro-grammable logic devices (PLDs), and field programmable gate arrays (FPGAs), which are configured to perform the techniques described herein, may be provided in the processor 128*a*, 128*b*.

The transmitter 122*a*, 122*b* may perform coding and modulation of data, which are scheduled from the processor 128*a*, 128*b* or a scheduler coupled to the processor 128*a*, 128*b*. For example, the transmitter 122*a*, 122*b* may convert data streams intended for transmission into signal streams through de-multiplexing, channel coding, modulation, and the like. The signal streams are transmitted through a transmitting processor within the transmitter and the trans-mitting antenna 120*a*, 120*b* in due order. The transmitter 122*a*, 122*b* and the receiver 124*a*, 124*b* of the user equip-ment 104 and the base station 102 may be configured differently depending on a processing procedure of trans-mitting and receiving signals.

It is noted that generally other network entities, such as the network configuration server 110, the noise configura-tion server 114 and the measurement analysis server 116 are similarly structured and each respectively includes a memory and a processor as well as a communication device that may be a transmitter, receiver, transceiver or modem, among others. The communication device may communi-cate wirelessly or in a wired manner. The respective memory of a network entity stores computer-executable instructions that, when executed by the respective processor of the network entity, cause the respective processor to operate and perform the functions and techniques described herein.

The various embodiments described above can be com-bined to provide further embodiments. These and other changes can be made to the embodiments in light of the above-detailed description. In general, in the following claims, the terms used should not be construed to limit the claims to the specific embodiments disclosed in the speci-fication and the claims, but should be construed to include all possible embodiments along with the full scope of equivalents to which such claims are entitled. Accordingly, the claims are not limited by the disclosure.

The invention claimed is:
1. A system, comprising:
a noise configuration server configured to:
for each sequentially varied parameter of a plurality of parameters of a network:

determine a signal quality change in a geographic area associated with a network for different varied parameters; and
sequentially vary a next parameter from the plurality of parameters of the network based on the signal quality change during a first period of time relative to one or more previously varied parameters when the network is actively used for trafficking data in the geographic area;
a measurement analysis server configured to:
for each sequentially varied parameter during the first period of time:
obtain, from a first communication device, a first signal quality measurement for a first signal qual-ity metric;
obtain, from a second communication device that is separate from the first communication device, a second signal quality measurement for a second signal quality metric, wherein the second signal quality metric is different from the first signal quality metric; and
aggregate the first signal quality measurement and the second signal quality measurement into an aggregated signal quality metric that is different from the first signal quality metric and the second signal quality metric;
determine a signal quality for the network using the sequentially varied parameter based on the aggre-gated signal quality metric; and
provide the signal quality for the network using the sequentially varied parameter to the noise con-figuration server;
determine an optima signal quality for the network based on the signal quality for each sequentially varied parameter, wherein the optima signal quality includes a global optima for the geographic area and a plurality of local optima for different locations within the geographic area; and
identify a first set of parameters that result in the optima signal quality; and
a network configuration server configured to:
configure the network to use the first set of parameters in the geographic area during a second period of time subsequent to the first period of time.
2. The system of claim 1, wherein:
the network includes a plurality of radiating antennas and a plurality of user equipment, and
the noise configuration server varies the next parameter of the network by being configured to:
vary a frequency band used by a radiating antenna of the plurality of radiating antennas;
vary a modulation scheme used by the radiating antenna of the plurality of radiating antennas;
vary a transmit power of the radiating antenna of the plurality of radiating antennas;
vary a beam direction of an antenna array; or
vary an antenna polarization of the radiating antenna of the plurality of radiating antennas.
3. The system of claim 2, wherein the noise configuration server varies the next parameter of the network by being configured to:
vary the frequency band used by a user equipment of the plurality of user equipment;
vary the modulation scheme used by the user equipment of the plurality of user equipment; or
vary the transmit power of the user equipment of the plurality of user equipment.

4. The system of claim 2, wherein the measurement analysis server is configured to:

receive the first signal quality measurements from a cell, the radiating antenna or a base station; and receive the second signal quality measurements from the plurality of user equipment.

5. The system of claim 1, wherein the measurement analysis server is configured to:

determine a plurality of signal qualities of a plurality of locations, respectively, in the geographic area.

6. The system of claim 5, wherein the measurement analysis server is configured to:

determine the optima signal quality at a location of the plurality of locations.

7. The system of claim 5, wherein the measurement analysis server is configured to:

aggregate the plurality of signal qualities; and determine the optima signal quality for the aggregated plurality of signal qualities.

8. The system of claim 1, wherein the signal quality is at least one of a signal-to-noise-and-interference ratio (SINR), power spectral density, channel impulse response, channel state information (CSI), modulation error vector magnitude (EVM), reference signal received power (RSRP), received signal strength indicator (RSSI), reference signal received quality (RSRQ) or a key performance indicator (KPI).

9. The system of claim 1, wherein the noise configuration server varies the next parameter of the network by being configured to:

determine whether one or more preceding changes to the one or more previously varied parameters of the network caused the signal quality to increase or decrease;

in response to determining that the one or more preceding changes to the one or more previously varied parameters caused the signal quality to decrease, reverse the one or more preceding changes to the one or more previously varied parameters; and in response to determining that the one or more preceding changes to the one or more previously varied parameters caused the signal quality to increase, vary the next parameter of the network to make a magnitude of change greater than the magnitude of change accomplished by the one or more preceding changes to the one or more previously varied parameters.

10. A method for optimizing coverage of a network, comprising:

during a first period of time:

sequentially varying a plurality of parameters of the network when the network is actively used for trafficking data in a geographic area, including:

in response to each sequentially varied parameter of the plurality of parameters:

obtaining, from a first communication device, a first signal quality measurement for a first signal quality metric;

obtaining, from a second communication device that is separate from the first communication device, a second signal quality measurement for a second signal quality metric, wherein the second signal quality metric is different from the first signal quality metric; and aggregating the first signal quality measurement and the second signal quality measurement into an aggregated signal quality metric that is different from the first signal quality metric and the second signal quality metric;

determining a signal quality for the network relative a currently varied parameter based on the aggregated signal quality metric; and selecting a next subsequent parameter from the plurality of parameters based on changes in the signal quality determined for the network relative to one or more previously varied parameters;

varying the next subsequent parameter of the network;

determining an optima signal quality for the network based on the signal quality for each varied parameter, wherein the optima signal quality includes a global optima for the geographic area and a plurality of local optima for different locations within the geographic area;

identifying a first set of parameters that result in the optima signal quality; and during a second period of time subsequent to the first period of time:

configuring the network to use the first set of parameters in the geographic area.

11. The method of claim 10, wherein varying the next subsequent parameter of the network includes:

varying a frequency band used by a radiating antenna of a plurality of radiating antennas included in the network;

varying a modulation scheme used by the radiating antenna of the plurality of radiating antennas;

varying a transmit power of the radiating antenna of the plurality of radiating antennas;

varying a beam direction of an antenna array; or varying an antenna polarization of the radiating antenna of the plurality of radiating antennas.

12. The method of claim 10, wherein varying the next subsequent parameter of the network includes:

varying the frequency band used by a user equipment of a plurality of user equipment associated with the network;

varying the modulation scheme used by the user equipment of the plurality of user equipment; or varying the transmit power of the user equipment of the plurality of user equipment.

13. The method of claim 10, comprising:

receiving the first signal quality measurements from a cell, a radiating antenna of the network, or a base station of the network; and receiving the second signal quality measurements from a plurality of user equipment associated with the network.

14. The method of claim 10, wherein determining the signal quality includes:

determining a plurality of signal qualities of a plurality of locations, respectively, in the geographic area.

15. The method of claim 14, wherein determining the optima signal quality comprises:

determining the optima signal quality at a location of the plurality of locations.

16. The method of claim 14, wherein determining the optima signal quality comprises:

aggregating the plurality of signal qualities; and determining the optima signal quality for the aggregated plurality of signal qualities.

17. The method of claim 10, wherein the signal quality is at least one of a signal-to-noise-and-interference ratio (SINR), power spectral density, channel impulse response, channel state information (CSI), modulation error vector magnitude (EVM), reference signal received power (RSRP), received signal strength indicator (RSSI), reference signal received quality (RSRQ) or a key performance indicator (KPI).

18. The method of claim 10, wherein selecting the next subsequent parameter of the network includes:

determining whether one or more preceding changes to the one or more previously varied parameters of the network caused the signal quality to increase or decrease;

in response to determining that the one or more preceding changes to the one or more previously varied parameters caused the signal quality to decrease, reversing the one or more preceding changes to the one or more previously varied parameters; and in response to determining that the one or more preceding changes to the one or more previously varied parameters caused the signal quality to increase, varying the next subsequent parameter of the network to make a magnitude of change greater than the magnitude of change accomplished by the one or more preceding changes to the one or more previously varied parameters.

\* \* \* \* \*